United States Patent [19]

Chang et al.

[11] Patent Number: 4,521,551

[45] Date of Patent: Jun. 4, 1985

[54] DENTURE FIXATIVE COMPOSITION CONTAINING PARTIALLY NEUTRALIZED COPOLYMERS OF MALEIC ACID OR ANHYDRIDE AND ALKYL VINYL ETHERS WHICH ARE OPTIONALLY PARTIALLY CROSSLINKED

[75] Inventors: Tiang-Shing Chang, Westfield; Lucy J. Zientek, Bayonne, both of N.J.

[73] Assignee: Block Drug Company, Inc., Jersey City, N.J.

[21] Appl. No.: 557,737

[22] Filed: Dec. 2, 1983

[51] Int. Cl.³ .......................... A61K 5/00; C08L 1/26; C09J 3/04; C09J 3/14
[52] U.S. Cl. .................................. 523/120; 106/35; 260/998.11; 524/45; 524/503
[58] Field of Search .................... 523/120; 106/35, 55; 260/998.11; 524/45, 503

[56] References Cited

U.S. PATENT DOCUMENTS

| | | | |
|---|---|---|---|
| 3,003,988 | 10/1961 | Germann et al. | 525/327.8 |
| 3,736,274 | 5/1973 | Schoenholz et al. | 523/120 |
| 3,740,361 | 6/1973 | Altwirth | 523/120 |
| 3,868,432 | 2/1975 | Keegan et al. | 525/203 |
| 4,339,279 | 7/1982 | Hesselgren | 106/35 |

*Primary Examiner*—Ronald W. Griffin
*Attorney, Agent, or Firm*—Ostrolenk, Faber, Gerb & Soffen

[57] ABSTRACT

Denture fixative compositions contain denture fixative excipients and as the denture fixative, a water soluble partially neutralized alkyl vinyl ether-maleic acid or anhydride copolymer, optionally partly crosslinked, and at least one hydrophilic polymer, preferably sodium carboxymethylcellulose, polyethylene oxide or hydroxypropyl guar.

17 Claims, No Drawings

DENTURE FIXATIVE COMPOSITION CONTAINING PARTIALLY NEUTRALIZED COPOLYMERS OF MALEIC ACID OR ANHYDRIDE AND ALKYL VINYL ETHERS WHICH ARE OPTIONALLY PARTIALLY CROSSLINKED

BACKGROUND OF THE INVENTION

An extremely desirable characteristics of a denture fixative composition is that it quickly generates tacky, uniform and viscous mucilages upon contact with saliva. It is also highly desirable that the mucilages spread over the denture-mucosa interface in order to effectively seal the denture in place and that the mucilages possess sufficient cohesive strength to withstand the stresses of mastication which act to rupture the seal and thus dislodge the denture.

U.S. Pat. No. 3,003,988 describes a dental fixative composition in which the dental fixative is a mixed partial salt containing calcium cations and alkali or quaternary ammonium cations of a lower alkyl vinyl ether-maleic anhydride type copolymer. The mixed salt copolymer is described as a water insoluble but water sensitized copolymer.

U.S. Pat. No. 3,736,274 teaches a dental fixative composition which contains a lower alkyl vinyl ether maleic anhydride polymeric material, a polymeric N-vinyl lactam and sodium carboxymethylcellulose. The carboxymethylcellulose prevents the maleic anhydride copolymer N-vinyl lactam complex from completely precipitating when placed in water.

U.S. Pat. No. 3,868,432 teaches an anhydrous denture adhesive composition which is a mixture of a cationic polymeric component which is a copolymer of an acrylamide and an anionic synthetic gum component which can be a copolymer of maleic acid with vinyl lower alkyl ether.

It has now been discovered that certain partially neutralized copolymers of alkyl vinyl ethers and maleic acid or anhydride, optionally partially crosslinked, can be employed as a denture fixative when combined with certain hydrophilic polymers. Despite being water soluble, the partly neutralized or partly neutralized and crosslinked copolymers develop, when in contact with saliva, a high degree of tack and a viscous mucilage of high cohesive strength which can be spread over the denture mucosa interface to fill the gaps and thus provide superior fixative properties.

Accordingly, it is the object of this invention to provide new denture fixative compositions in which the fixative is water soluble yet develops a high degree of tack and viscous mucilage of high cohesive strength when contacted with saliva. This and other objects of the invention will become apparent to those skilled in this art from the following detailed description.

SUMMARY OF THE INVENTION

This invention relates to denture fixative compositions in powder, liquid, cream or film form. More particularly, the denture fixative compositions contain a partly neutralized or partly neutralized and crosslinked copolymer of maleic acid or anhydride and lower alkyl vinyl ethers, and at least one hydrophilic polymer, preferably, sodium carboxymethylcellulose, polyethylene oxide, or hydroxypropyl guar.

DESCRIPTION OF THE INVENTION

The denture fixative compositions of the present invention are in powder, liquid, cream or film forms and when contacted with saliva, develop a high degree of tack and viscous mucilages of high cohesive strength, which can spread over the dentura-mucosa interface to fill the gaps so as to provide a superior suction-type seal. The compositions contain an active denture fixative together with an excipient therefore. Typical materials which are considered denture excipients are flavoring agents, coloring agents, preservatives, and thickeners. Also vehicles such as petrolatum, mineral oil and the like in cream type formulations, and non-toxic anticaking agents such as silica, magnesium stearate, talc, dicalcium phosphate anhydrous and the like can be present.

The active fixatives are certain water soluble partially neutralized copolymers of a lower alkyl vinyl ether and maleic acid or anhydride which, in the form of a 1% aqueous solution, has a pH of at least about 4.5, and preferably about 5–7. The copolymer can also be partly crosslinked or can be employed in conjunction with the crosslinking agent in an amount sufficient to partly crosslink the copolymer.

The copolymers of the lower alkyl vinyl ether and maleic acid or anhydride used in the present invention has specific viscosities in the range of about 1.5 to about 3.5. Such copolymers have the repeating structural unit

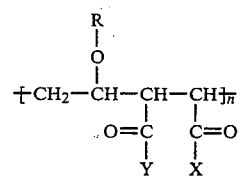

where X and Y separately each represent a hydroxyl moiety or together represent a single oxygen. R represents a lower alkyl moiety of 1 to about 5 carbon atoms. The copolymers are obtained by copolymerizing a lower alkyl vinyl ether monomer whith maleic acid or anhydride. Suitable copolymers are commercially available.

Typical lower alkyl vinyl ethers include methyl vinyl ether, ethyl vinyl ether, divinyl ether, propyl vinyl ether, isobutyl vinyl ether and the like. It will be appreciated that the copolymers can also contain mixtures of the vinyl ethers.

The copolymers employed in the present invention are neutralized, and optionally crosslinked, such that up to about 70% of the total number of initial carboxyl groups in the copolymer are consumed. In determining the total number of initial carboxyl groups, the anhydride radical is considered as having two such groups. Thus, the copolymers as used in the present invention will contain at least about 30% of unreacted initial carboxyl groups.

The neutralization agents employed in the present invention are the salts, bases and oxides of monovalent cations, preferably but not exclusively alkali metal cations. Most preferably, the cations are sodium or potassium. The neutralization agents are employed in a quantity sufficient to react with about 10–70% of the total number of initial carboxyl groups in the copolymer and preferably about 20–60%. The neutralization reaction can be carried out according to well known techniques.

The crosslinking agents employed in the present invention are polyhydroxyl compounds. The polyhydroxyl compounds generally contain 2 to about 6 carbon atoms and preferably 2-3 hydroxyl groups and typical examples include glycerin, propylene glycol, ethylene glycol, tetramethylene glycol, and the like. The crosslinking agents are employed in quantities sufficient to crosslink up to 50% of the total number of initial carboxyl groups. When employed, the crosslinking agents are preferably used in amounts sufficient to crosslink about 5-35% of the initial carboxyl groups.

The anions of the salt and bases can be such diverse materials as hydroxide, acetate, lactate, gluconate, carbonate, and the like. It will be appreciated that any neutralization or crosslinking agent which is used must be dentally acceptable and any material which forms toxic or irritating by-products should be avoided. It will further be appreciated that the neutralization or neutralization and crosslinking agents are employed in appropriate amounts such that the resulting fixative is a water soluble material.

One embodiment of the invention which has been found to be particularly convenient is to combine a partially neutralized copolymer with the intended crosslinking agent in the denture fixative composition and permit the crosslinking reaction to occur in situ when the denture fixative formulation is exposed to saliva. Example 5 below is illustrative of such compositions.

The suitable hydrophilic polymers used in this invention can be synthetic gums such as cellulose derivatives, polyethylene oxide, and polyvinyl alcohol or natural gums such a guar, alginate, karaya and xanthan gum, preferably, sodium carboxymethylcellulose, polyethylene oxide and hydroxypropyl guar. The further improvement of the adhesive properties apparently is due to a synergistic effect brought about by the combination.

The denture fixative is incorporated in the denture fixative composition in an effective fixative amount. Such amount will vary depending on the particular vinyl ether-maleic acid or anhydride copolymer employed, the degree of neutralization of the copolymer, the degree of crosslinking, the amount of the hydrophilic polymer, and the other constituents of the fixative composition. In general, the fixative is about 10 to 70 wt.% of the denture fixative composition and preferably 15-65 wt.%, and the partially neutralized copolymers of a lower alkyl vinyl ether maleic acid or anhydride constitutes about 10-80% of the fixative mixture and preferably about 30-70 weight percent.

In order to further illustrate the present invention, various examples are set forth below. In these examples as well as throughout this specification and claims, all parts and percentages are by weight and all temperatures in degrees Celsius unless otherwise specified.

EXAMPLES 1-2

There was introduced into and dissolved in a reaction kettle containing 740 parts of glycerin and 150 parts of a copolymer of ethyl vinyl ether-maleic anhydride (PVE/MA) which had a specific viscosity of 2.6. 30 parts of sodium hydroxide in 150 parts of water were slowly added to the rapidly agitated solution and the resulting mixture heated to 45° C. where it was maintained for one hour. The resulting product was then dried, ground and screened through a 100 mesh sieve to obtain a powder having a packed density of 0.75 g/ml and a pH of 6 as a 1% aqueous solution.

A cream denture fixative composition was prepared with the foregoing partially neutralized and crosslinked copolymer by mixing together the following ingredients:

| | |
|---|---|
| Na glycerin PVE/MA | 25 parts |
| Hydroxypropyl guar gum | 15 parts |
| Mineral oil and petrolatum | 59 parts |
| Flavor, color and preservative | 1 part |

A liquid denture fixative composition was prepared by mixing together the following components:

| | |
|---|---|
| Na glycerin PVE/MA | 18 parts |
| Hydroxypropyl guar gum | 16 parts |
| Mineral oil/polyethylene base | 65 parts |
| Flavor, color, preservative | 1 part |

EXAMPLE 3

A copolymer of ethyl vinyl ether-maleic anhydride (PVE/MA) having a specific viscosity of 3.2 in an amount of 200 parts was dissolved in 600 parts of water in a reaction kettle. The solution was rapidly agitated and 60 parts of potassium hydroxide in 140 parts of water were added slowly to the rapidly agitated solution. The mixture was then heated to 45° C., held at this temperature for one hour and the resulting product, dried, ground and screened through 100 mesh sieve. The resulting powder had a packed density of 0.74 g/ml and a 1% aqueous solution had a pH of 6.3. The resulting partially neutralized copolymer was incorporated into a cream denture fixative composition by mixing 27 parts of the K PVE/MA, 10 parts of Polyox WSR-301 (polyethylene oxide), 62 parts of mineral oil and petrolatum, and 1 part of flavor, color and preservative.

EXAMPLE 4

A film denture fixative was prepared by mixing 50 parts of the partially neutralized copolymer described in Example 6 with 49 parts of Polyox WSR-301 and 1 part of color, flavor, antioxidant and preservative additives. 120 parts of the resulting mixture were dissolved in a mixture containing 472 parts of water and 8 parts of glycerin. A viscous solution resulted which was heated to 45° C. and deaerated under vacuum before casting and drying at a temperature of 55°±5° C. The resulting film showed excellent flexibility and had a thickness of 0.006 inch (6 mils).

EXAMPLE 5

A cream denture fixative composition was prepared by mixing 30 parts of the potassium PVE/MA of Example 3, 1.5 parts of glycerin, 13 parts of sodium carboxymethylcellulose, 55 parts of mineral oil and petrolatum, and 0.5 part of flavor, color and preservative additives. The glycerin will partially crosslink the partially neutralized copolymer when this composition is exposed to saliva.

Various changes and modifications can be made in the products of this invention without departing from the spirit and scope thereof. The various embodiments which have been disclosed herein were for the purpose of further illustrating the invention but were not intended to limit it.

What is claimed is:

1. A denture fixative composition comprising a denture fixative excipient and an effective denture fixative amount of a mixture of a water soluble partially neutralized and partially crosslinked lower alkyl vinyl ether-maleic acid or anhydride copolymer, a 1% aqueous solution of which has a pH of at least about 4.5 and said copolymer containing at least about 30% unreacted initial carboxyl groups, and at least one hydrophilic polymer, said composition developing when contacted with saliva a high degree of tack and viscous musilage and which spreads over the denture-mucosa interface to fill the gaps so as to provide a suction-type seal.

2. The denture fixative composition of claim 1 wherein said copolymer prior to neutralization and crosslinking has a specific viscosity of about 1.5–3.5 and said solution has a pH of about 5–7, wherein said hydrophilic polymer is a cellulose derivative, polyethylene oxide, polyvinyl alcohol or a natural gum, and wherein said copolymer is about 10–80% of said mixture.

3. The denture fixative composition of claim 2 wherein about 20–60% of the initial carboxy group have been neutralized by a monovalent cation, wherein said hydrophilic polymer is sodium carboxymethylcellulose, polyethylene oxide or hydroxypropyl guar, and wherein said copolymer is about 30–70% of said mixture.

4. The denture fixative composition of claim 3 wherein said monovalent cation is an alkali metal cation.

5. The denture fixative composition of claim 4 wherein said alkali metal cation is sodium or potassium and said lower alkyl moiety is methyl or ethyl.

6. The denture fixative composition of claim 1 wherein said copolymer is partially crosslinked by at least one polyhydroxyl compound.

7. The denture fixative composition of claim 6 wherein said polyhydroxy compound contains 2 to about 6 carbon atoms.

8. The denture fixative composition of claim 7 wherein up to 50% of the initial carboxyl groups have been crosslinked.

9. The denture fixative composition of claim 1 wherein the copolymer is partially neutralized by an alkali metal cation and partially crosslinked by at least one polyhydroxyl compound.

10. The denture fixative composition of claim 9 wherein said alkali metal is sodium or potassium, said polyhydroxy compound is glycerin or propylene glycol and said lower alkyl moiety is methyl or ethyl.

11. The denture fixative composition of claim 10 wherein about 20–60% of the initial carboxy groups have been neutralized and about 5–35% of the initial carboxy groups have been crosslinked.

12. In a method of adhering dentures to oral mucosa employing a denture fixative which spreads over the denture-mucosa interface to form a suction-type seal, the improvement which comprises employing the denture fixative composition of claim 1 as said fixative.

13. In a method of adhering dentures to oral mucosa employing a denture fixative which spreads over the denture-mucosa interface to form a suction-type seal, the improvement which comprises employing the denture fixative composition of claim 5 as said fixative.

14. In a method of adhering dentures to oral mucosa employing a denture fixative which spreads over the denture-mucosa interface to form a suction-type seal, the improvement which comprises employing the denture fixative composition of claim 6 as said fixative.

15. In a method of adhering dentures to oral mucosa employing a denture fixative which spreads over the dentura-mucosa interface to form a suction-type seal, the improvement which comprises employing the denture fixative composition of claim 9 as said fixative.

16. In a method of adhering dentures to oral mucosa employing a denture fixative which spreads over the denture-mucosa interface to form a suction-type seal, the improvement which comprises employing the denture fixative composition of claim 10 as said fixative.

17. In a method of adhering dentures to oral mucosa employing a denture fixative which spreads over the denture-mucosa interface to form a suction-type seal, the improvement which comprises employing the denture fixative composition of claim 11 as said fixative.

* * * * *

UNITED STATES PATENT AND TRADEMARK OFFICE
CERTIFICATE OF CORRECTION

PATENT NO. : 4,521,551

DATED : June 4, 1985

INVENTOR(S) : Tiang-Shing Chang and Lucy J. Zientek

It is certified that error appears in the above-identified patent and that said Letters Patent is hereby corrected as shown below:

In the headings read

--[63] Related U.S. application data Continuation-in-Part of Serial No. 332,889, filed December 21, 1981, abandoned.--

Signed and Sealed this

Thirteenth Day of January, 1987

*Attest:*

DONALD J. QUIGG

*Attesting Officer*      *Commissioner of Patents and Trademarks*